United States Patent [19]

Renner

[11] Patent Number: 4,587,317

[45] Date of Patent: * May 6, 1986

[54] CROSSLINKED POLYMERS OBTAINABLE BY CATIONIC POLYMERIZATION AND FORMED FROM UNSATURATED BICYCLIC IMIDES

[75] Inventor: Alfred Renner, Muntelier, Switzerland

[73] Assignee: Ciba-Geigy Corporation, Ardsley, N.Y.

[ * ] Notice: The portion of the term of this patent subsequent to May 7, 2002 has been disclaimed.

[21] Appl. No.: 696,630

[22] Filed: Jan. 31, 1985

[30] Foreign Application Priority Data

Jan. 31, 1984 [CH] Switzerland .......................... 449/84

[51] Int. Cl.⁴ .............................................. C08F 26/06
[52] U.S. Cl. .................................... 526/259; 526/262; 526/281
[58] Field of Search ........................ 526/259, 262, 281

[56] References Cited

U.S. PATENT DOCUMENTS 3,105,839 10/1963 Renner ................................ 549/237
3,781,247 12/1973 Burns et al. .......................... 525/436
4,100,140 7/1978 Zahir et al. ............................ 526/90
4,111,771 9/1978 Darms et al. ..................... 204/159.22
4,515,962 5/1985 Renner ................................ 548/435

FOREIGN PATENT DOCUMENTS 0105024 4/1984 Switzerland .

Primary Examiner—Paul R. Michl
Assistant Examiner—Alex H. Walker
Attorney, Agent, or Firm—Luther A. R. Hall

[57] ABSTRACT

Crosslinked polymers which can be obtained by heating imides of the formula I

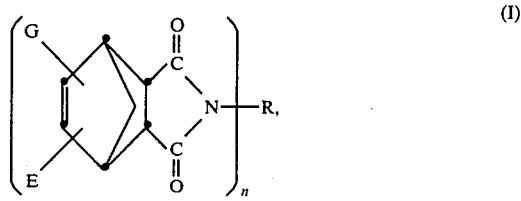

in which E is allyl or methallyl, G is hydrogen or methyl, R is hydrogen, alkyl, alkenyl, cycloalkyl, aryl, benzyl, alkylene or arylene and n is 1 or 2, in the presence of a catalyst suitable for cationic polymerization. The use of the catalyst makes it possible to carry out curing at relatively low temperatures and within short reaction times. The polymers can be used, in particular, for the preparation of heat-resistant composite materials and they can also be used as electrical insulating materials and whirl-sintered powder paints.

18 Claims, No Drawings

CROSSLINKED POLYMERS OBTAINABLE BY CATIONIC POLYMERIZATION AND FORMED FROM UNSATURATED BICYCLIC IMIDES

The present invention relates to novel crosslinked polymers obtainable by cationic polymerization and formed from allyl-substituted or methallyl-substituted and, if appropriate, methyl-substituted bicyclo[2,2,1]-hept-5-ene-2,3-dicarboximides and to thermosetting (crosslinkable) mixtures of substances which are stable on storage and contain the bicyclic imide and a catalyst suitable for the cationic polymerization.

Crosslinked polymers containing imide groups are known as valuable plastics which are distinguished, in particular, by their high resistance to heat.

German Offenlegungsschrift No. 2,627,045 describes a process in which maleimides are reacted with alkenylphenols and alkenyl phenol ethers, if appropriate in the presence of a free-radical catalyst or a basic, ionic catalyst, to give crosslinked polymers.

It is known from German Offenlegungsschrift No. 2,657,049 that imides containing several double bonds, inter alia nadicimides, can be reacted to give crosslinked polymers by heating, even in the absence of additional reactants. In general, however, very high temperatures and long reaction times are required for this. The process leading to the crosslinked polymers according to the invention now makes crosslinking possible at lower temperatures (in general below 200° C.) and in a substantially shorter time (less than 6 hours).

The invention relates to crosslinked polymers which can be obtained by heating imides of the formula I

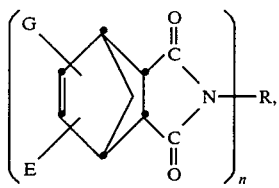
(I)

in which E is allyl or methallyl, G is hydrogen or methyl and n is 1 or 2 and, if n is 1, R is hydrogen, alkyl having 1–12 C atoms, alkenyl having 3–6 C atoms, cycloalkyl having 5–8 C atoms, aryl having 6–10 C atoms or benzyl or, if n is 2, R is —$C_mH_{2m}$— in which m=2–20, arylene having 6–10 C atoms or a group of the formula II

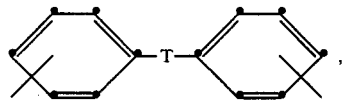
(II)

in which T is methylene, isopropylidene, CO, O, S or $SO_2$, in the presence of at least one catalyst suitable for cationic polymerization.

The reaction is preferably carried out at a temperature of 160°–260° C., particularly preferably at 180°–250° C. and especially at 180°–200° C., for about 1–6 hours, particularly preferably for about 3–5 hours.

R can be a linear or branched-chain alkyl group having 1–12 C atoms, such as methyl, ethyl, isopropyl, n-butyl, isopentyl, n-hexyl, 2-ethylhexyl, n-decyl and n-dodecyl, preferably alkyl having 1–8 C atoms.

R can also be a linear or branched-chain alkenyl group having 3–6 C atoms, such as allyl, methallyl, 2-butenyl, and 3-hexenyl, preferably allyl.

If R is a cycloalkyl group, it can be a cyclopentyl, cyclohexyl, cycloheptyl or cyclooctyl group, preferably a cyclohexyl group.

If R is an aryl group, it can be unsubstituted phenyl or a phenyl group which is substituted by one or two methyl groups, such as tolyl or xylyl, or else naphthyl. The phenyl group is preferred. If R is a group —$C_mH_{2m}$—, it can be a linear or branched radical, such as ethylene, propylene, trimethylene, tetramethylene, hexamethylene, octamethylene and dodecamethylene. If R is a group of the formula II, the latter is preferably attached to the N atoms in the 4,4′-position.

R is preferably a group —$(CH_2)_m$— in which m is 2 to 12.

If R is an arylene group having 6–10 C atoms, it can be, for example, an m-phenylene, p-phenylene, 1,3-naphthylene, 1,4-naphthylene or 1,5-naphthylene group.

If R is a group of the formula II, T is preferably the methylene group, O or $SO_2$.

It is preferable to use compounds of the formula I in which G is as defined under formula I, E is allyl and, if n is 1, R is hydrogen, alkyl having 1–8 C atoms, allyl, cyclohexyl, phenyl or benzyl, or, if n is 2, R is —$(CH_2)_m$— in which m is 2–12, m-phenylene or p-phenylene or a group of the formula II in which T is the methylene group, O or $SO_2$.

It is particularly preferable to use compounds of the formula I in which E is the allyl group, G is hydrogen, n is the number 2 and R is —$(CH_2)_2$—, —$(CH_2)_6$— or

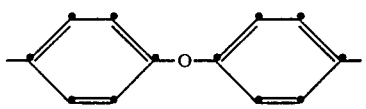

and especially

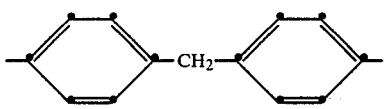

Mixtures of different bicyclic imides of the formula I can also be used in accordance with the invention.

The imides to be employed in accordance with the invention can be prepared in a manner known per se, for example by reacting an anhydride of the formula III

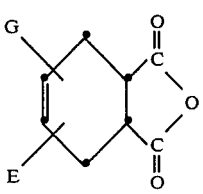
(III)

with a compound of the formula IV $(H_2N)_nR$ (IV)

in which E, G, R and n are as defined under formula I, at an elevated temperature and with removal by distillation of the water formed in the reaction. If the compounds of the formula IV are ammonia or low-boiling monoamines, an excess of these reactants is advisable. It is advantageous to employ diamines in a stoichiometric ratio. The reaction can be carried out without a solvent or in the presence of an inert solvent which can be used for the azeotropic removal of the water (entraining agent). The temperature of the reaction can be between 100° and 250° C. It is preferable to prepare the imides of the formula I in the melt at a pressure of not more than 4,500 Pa and at temperatures between 130° and 220° C., especially 180° and 220° C.

The starting materials of the formula III can be prepared by the process described in U.S. Pat. No. 3,105,839 by reacting sodium cyclopentadienide or methylcyclopentadienide with an allyl or methallyl halide, followed by a Diels-Alder reaction with maleic anhydride. Although it is stated in the U.S. patent specification that the allyl or methallyl group is attached in the 7-position of the bicyclic system, recent investigations show that an iosmeric mixture is formed in respect of the position of the allyl group and also in respect of the endo- and exo-configuration of the anhydride moiety. Hitherto, it has only been possible to separate the isomeric components by gas chromatography.

The monoamines or diamines of the formula IV used are known or can be prepared by processes known per se.

Compounds of the formula I to be employed are liquid or low-melting solid substances which can be polymerized by the present process to give solid products, according to the invention, having a high glass transition temperature and good resistance to heat and water. These products can be used for many purposes, for example as casting resins or adhesives and, particularly, for the preparation of heat-resistant composite materials, and as electrical insulating materials and whirl-sintered powder paints.

The concentration of the catalyst to be employed in accordance with the present invention is advantageously between 0.1 and 5.0, preferably between 0.25 and 4.0 and particularly preferably between 0.5 and 2.0, % by weight, based on the compound of the formula I.

Polymerization catalysts which can be employed in accordance with the invention are acids or derivatives of acids which liberate acid. in principle, it is possible to employ any desired acids or acid derivatives which have a suitable degree of acidity and do not decompose or volatilize at the polymerization temperatures.

Examples of suitable catalysts are Brønsted oxo acids or derivatives thereof, in particular esters, anhydrides or halides thereof or amides or ammonium salts with organic bases containing nitrogen.

Examples of oxo acids which can be mentioned are inorganic or mineral acids or organic acids, such as, for example organic phosphorus-oxygen acids, organic sulfuroxygen acids or carboxylic acids containing halogen.

Examples of mineral acids which can be mentioned are perchloric acid, fluorsulfonic acid, chlorsulfonic acid, sulfuric acid, phosphoric acid, polyphosphoric acid, phosphorous acid and hypophosphorous acid.

Examples of suitable organic phosphorus-oxygen acids are phosphonic and phosphinic acids. Both P-alkyl and P-aryl derivatives are suitable, for example preferably those having, in each case, 1-6 C atoms in the alkyl groups or 6-10 C atoms in the aryl groups, particularly phenylphosphonic acid and phenylphosphinic acid.

Examples of organic sulfur-oxygen acids which can be used are aliphatic sulfonic acids and, particularly, aromatic sulfonic acids, such as methanesulfonic acid, benzenesulfonic acid, naphthalene-2-sulfonic acid or, especially, p-toluenesulfonic acid. The sulfonic acids can also contain further substituents in the ring, for example halogen, cyano, nitro, hydroxyl or alkoxy or alkyl having up to 4 C atoms.

Examples of suitable carboxylic acids containing halogen are chloroacetic acid, dichloroacetic acid, trichloroacetic acid and trifluoroacetic acid.

Suitable ester derivatives of oxo acids are, in particular, alkyl, aralkyl or aryl esters. Examples of alcohols or substituted or unsubstituted phenols the esters of which can be employed as catalysts are, inter alia, alcohols having up to 10 C atoms, such as butanol, 1,4-butanediol, amyl alcohol or 2-ethylhexanol; benzyl alcohol, naphthol, cresol, xylenol and, in particular, phenol. For example, the following esters can be used: 1,4-butanediol bis-p-toluenesulfonate, amyl benzenesulfonate, 2-ethylhexyl benzenesulfonate, di-n-butyl and diphenyl phosphate, and di-n-butyl, diphenyl and triphenyl phosphite.

It is also possible to use boric acid as an oxo acid. Examples of suitable anhydrides are benzenesulfonic anhydride, p-toluenesulfonic anhydride, trifluoromethanesulfonic anhydride and trifluoroacetic anhydride.

Examples of suitable acid halides are fluorides, bromides, iodides and, especially, chlorides of the oxo acids mentioned above.

Organic bases containing nitrogen, such as aliphatic, cycloaliphatic, araliphatic and aromatic primary, secondary and tertiary amines, and also saturated and unsaturated heterocyclic bases containing nitrogen are suitable for forming amides or ammonium salts with the acids mentioned above.

For example, it is possible to employ aliphatic primary amines having, preferably, 1-18 C atoms, such as methylamine, ethylamine, n-butylamine, n-octylamine, n-dodecylamine and hexamethylenediamine, aliphatic secondary amines having, preferably, 2-16 C atoms, such as dimethylamine, diethylamine, di-n-propylamine and diisobutylamine, aliphatic tertiary amines having 1-20 C atoms in each of the alkyl groups, such as triethylamine or tri-n-butylamine, cycloaliphatic primary amines, such as cyclohexylamine, cycloaliphatic secondary amines, such as dicyclohexylamine, substituted or unsubstituted aromatic primary amines, such as aniline, toluidine or naphthylamine, aromatic tertiary amines, such as N,N-diethylaniline, and saturated and unsaturated heterocyclic bases containing nitrogen, such as pyrrolidine, imidazolidine, piperidine, N-methyl-2-pyrrolidine, pyrazolidine, piperazine, pyridine, imidazole and pyrazole or morpholine.

Examples of catalysts which can be used amongst the amides are 1-p-toluenesulfonylimidazole and benzenesulfonylimidazole.

It is also possible to employ, as catalysts according to the invention, Lewis acids or complexes of Lewis acids with bases, in particular with amines, for example those of the type described above, amides or phosphines.

Examples of suitable Lewis acids are halides of elements from groups II, III, IV or V of the periodic system of the elements.

Particularly suitable Lewis acids are iron trichloride, tin tetrachloride, antimony pentafluoride and, in particular, aluminium chloride, zinc chloride, boron trichloride and boron trifluoride.

The catalytic activity of the Lewis acids used in accordance with the invention can, if desired, be increased by adding small amounts of compounds containing acid hydrogen atoms, such as acids, phenols, alcohols or water.

Complexes of Lewis acids which can be employed in accordance with the invention as catalysts are, inter alia, the ethylamine/boron trichloride complex, the N,N-dimethyl-n-octylamine/boron trichloride complex, the acetylacetanilide/boron trifluoride complex, the dimethylaniline/boron trichloride complex and the tri-n-octylphosphine/boron trichloride complex.

Catalysts which are particularly preferred are p-toluenesulfonic acid, amyl benzenesulfonate, 2-hydroxycyclohexyl p-toluenesulfonate, diphenyl phosphite or the boron trichloride/ethylamine complex. Diphenyl phosphite is very particularly preferred as the catalyst.

It is also possible to employ, in accordance with the invention, a mixture of several of the catalysts described above.

The reaction according to the invention is preferably carried out in the melt or partly in the melt and partly in the solid phase. It can, however, also be carried out in solution. However, in most cases it is unnecessary to add solvents, because the starting mixtures as such are already liquid substances or low-melting solid substances.

Examples of suitable solvents are aromatic hydrocarbons, such as benzene, toluene and xylene, and also tetralin and decalin as well as chlorinated hydrocarbons, such as ethylene chloride and chlorobenzene, and glycol ethers, such as, for example the monomethyl, monoethyl, monobutyl and monophenyl ethers of ethylene glycol and diethylene glycol.

The process according to the invention can also be carried out in two stages as follows. After all the starting materials have been mixed and, if appropriate, subsequently ground, the powder or the liquid is first heated for a limited period, preferably at 120°–170° C. A partly soluble product which can still be shaped by heat is formed. This prepolymer must in some cases be ground again to give a processable powder before it is finally cured in the ultimate processing. The prepolymerization can also be carried out by heating a solution or suspension of the starting materials.

The preparation, according to the invention, of the crosslinked polymers containing imide groups is, as a rule, effected with simultaneous shaping to give shaped articles, sheet-like structures, laminates, adhesive bonds or foams. In the course of this, it is possible to add to the curable compositions the additives customary in the technology of curable plastics, such as fillers, plasticizers, pigments dyes, mould release agents or flame-retarding substances. Examples of fillers which can be used are glass fibers, carbon fibers, mica, graphite, quartz powder, kaolin, colloidal silicon dioxide or metal powders, while examples of mould release agents which can be used are silicone oil, various waxes, zinc or calcium stearate and the like.

The shaping of the products which can be prepared by the process according to the invention can in some cases be carried out by the casting process, using a hollow mould.

However, the shaping can also be carried out by the compression moulding process, using a moulding press. In most cases it is sufficient to heat only briefly at temperatures of 160° to 220° C. under a pressure of $9.81 \times 10^4$ to $1.96 \times 10^7$ Pa, and to effect complete curing of the resulting shaped article outside the press.

The invention also relates to thermosetting (crosslinkable) mixtures of substances which are stable on storage and which contain (a) a compound of the formula I

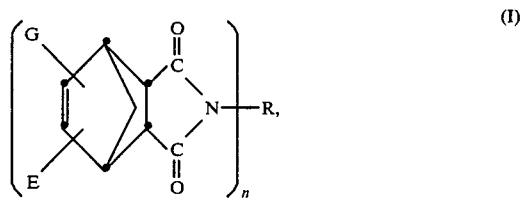

in which E is allyl or methallyl, G is hydrogen or methyl and n is 1 or 2 and, if n is 1, R is hydrogen, alkyl having 1–12 C atoms, alkenyl having 3–6 C atoms, cycloalkyl having 5–8 C atoms, aryl having 6–10 C atoms or benzyl, or, if n is 2, R is —$C_mH_{2m}$— in which m is 2–20, arylene having 6–10 C atoms or a group of the formula II

in which T is methylene, isopropylidene, CO, O, S or $SO_2$, and (b) one or more catalysts suitable for cationic polymerization.

(A) PREPARATION OF THE MONOMERS

EXAMPLE 1

Bis-[4-(allylbicyclo[2.2.1]hept-5-ene-2,3-dicarboximidophenyl)]methane

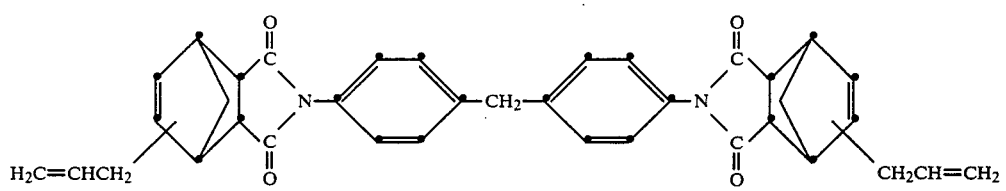

204 g of allylbicyclo[2.2.1]hept-5-ene-2,3-dicarboxylic anhydride containing 30 ppm of ferrocene are heated to 130° C. 99 g of 4,4'-diaminodiphenylmethane are added in portions, with stirring, and the water formed is distilled off. The temperature is raised to 200° C. and the pressure is lowered to 25 Pa. After three hours under these conditions, 257.6 g of an orange-coloured resin having a softening point of 80° C. and an acid number <1 are obtained.

| Analysis | % C | % H | % N |
| --- | --- | --- | --- |
| calculated for $C_{37}H_{34}N_2O_4$ | 77.87 | 6.01 | 4.91 |
| found: | 78.1 | 5.9 | 5.9 |

$\overline{M}_n = 700$ and $\overline{M}_w = 1615$, determined by gel permeation chromatography.

EXAMPLE 2

Allylmethylbicyclo[2.2.1]hept-5-ene-2,3-dicarboxylic acid N-allylimide

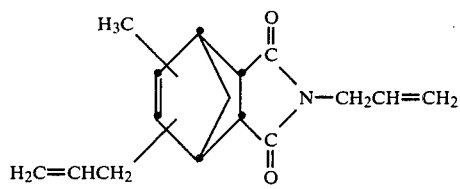

A mixture of 30 g of allylmethylbicyclo[2.2.1]hept-5-ene-2,3-dicarboxylic anhydride and 9.41 g of allylamine is heated at reflux temperature for 2 hours, water is distilled off and the product is rectified at 119°–127° C. and 2.66 Pa. This gives 30.24 g (85.5% of theory) of a pale yellow oil having the following characteristic data: $n^{20} = 1.5202$, $\eta_{25} = 0.135$ Pa.s.

| Analysis: | % C | % H | % N |
| --- | --- | --- | --- |
| calculated for $C_{16}H_{19}NO_2$: | 74.68 | 7.84 | 5.44 |
| found: | 74.66 | 7.55 | 5.22 |

Polymerization for 48 hours at 250° C. gives a solid having a $T_g > 250°$ C. and an IR spectrum which has no C=C absorption frequencies (1,639.2 and 1,653.4 cm$^{-1}$).

EXAMPLE 3

Bis-[4-(methallylbicyclo[2.2.1]hept-5-ene-2,3-dicarboximidophenyl)]methane

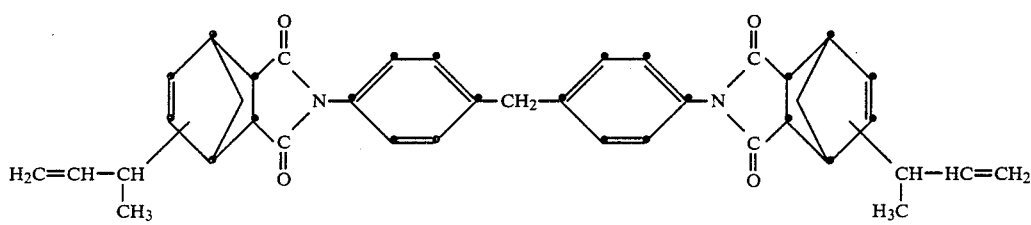

218 g of methallylbicyclo[2.2.1]hept-5-ene-2,3-dicarboxylic anhydride (boiling point 139°–142° C. at 20 Pa) and 99 g of 4,4'-diaminodiphenylmethane are heated to 200° C. in vacuo and kept for 1 hour at this temperature. This gives 295 g of a brown solid resin having a softening point of 98° C. and an acid number of 2 mg of KOH/g.

| Analysis: | % C | % H | % N |
| --- | --- | --- | --- |
| calculated for $C_{39}H_{38}N_2O_4$: | 78.24 | 6.40 | 4.69 |
| found: | 78.3 | 6.1 | 4.8 |

EXAMPLE 4

Bis-[4-(methallylmethylbicyclo[2.2.1]hept-5-ene-2,3-dicarboximidophenyl)]sulfone

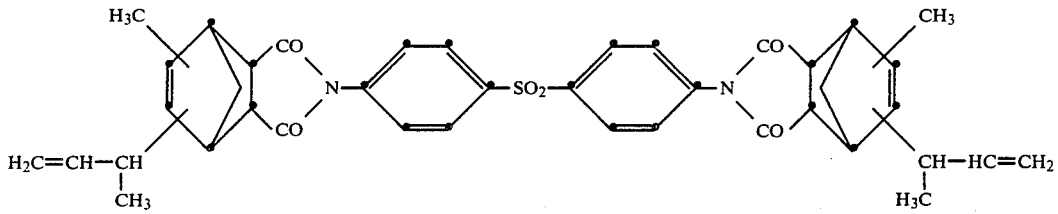

124.15 g of 4,4'-diaminodiphenyl sulfone and 232 g of methallylmethylbicyclo[2.2.1]-hept-5-ene-2,3-dicarboxylic anhydride are heated at 180° C. and the pressure is gradually reduced to 25 Pa. After 90 minutes at 180° C. and 25 Pa, 319.55 g of a brown solid resin having a glass transition temperature of 87° C. are obtained.

| Analysis: | % C | % H | % N | % S |
| --- | --- | --- | --- | --- |
| calculated for $C_{40}H_{40}N_2O_6S$: | 70.98 | 5.96 | 4.14 | 4.74 |
| found: | 69.98 | 5.91 | 4.35 | 4.98 |

The anhydride is prepared analogously to Examples 1 and 2 to U.S. Pat. No. 3,105,839. 994 g of methallyl chloride are used instead of 840 g of allyl chloride. The anhydride, which has not hitherto been described in the literature, distills at 125°–140° C., 25 Pa, and has an $n_D^{20}$ of 1.5085 and a viscosity of 195 cP.

EXAMPLE 5

N,N'-Hexamethylenebis-(allylbicyclo[2.2.1]hept-5-ene-2,3-dicarboxylimide)

A mixture of 204 g of allylbicyclo[2.2.1]hept-5-ene-2,3-dicarboxylic anhydride and 58 g of hexamethylenediamine is heated to 175° C. in the course of 3 hours, with stirring and under a descending condenser. The pressure is then reduced to 1866 Pa and the mixture is stirred for a further hour at 175° C. This gives 235 g of an amber-coloured resin which is still just liquid at room temperature.

| Analysis: | % C | % H | % N |
| --- | --- | --- | --- |
| calculated for $C_{30}H_{36}N_2O_4$: | 73.74 | 7.43 | 5.73 |

-continued

| Analysis: | % C | % H | % N |
|---|---|---|---|
| found: | 73.4 | 7.4 | 5.5. |

(B) CATIONIC POLYMERISATION EXAMPLES I-XLI 10 g of bis[4-(allylbicyclo[2.2.1]hept-5-ene-2,3-dicarboximidophenyl)]methane (prepared in accordance with Example 1), are melted, mixed in each case with the amount of catalyst indicated in the table, and heated for 4 hours at 190° C. in a small aluminium dish exposed to the air. (This is a curing cycle used in the preparation of high-grade, heat-resistant laminated materials.) After the crosslinked polymers have cooled, the glass transition temperature is determined by means of a TA 2000 thermoanalyzer made by Mettler (Greifensee, Switzerland). The results are shown in Table 1.

TABLE 1

Illustrative embodiments using various catalysts

| Example No. | Catalyst | mg/10 g polymer | Tg (°C.) |
|---|---|---|---|
| I | p-Toluenesulfonic acid | 10 | 150 |
| II | p-Toluenesulfonic acid | 25 | 213 |
| III | p-Toluenesulfonic acid | 50 | >235 |
| IV | p-Toluenesulfonic acid | 100 | 250 |
| V | 1,4-Butanediol bis-p-toluenesulfonate | 200 | 156 |
| VI | Amyl benzenesulfonate | 100 | >250 |
| VII | 2-Ethylhexyl benzenesulfonate | 200 | 225 |
| VIII | Benzenesulfochloride | 100 | 159 |
| IX | Naphthalene-2-sulfonic acid | 50 | >250 |
| X | 1-(p-toluenesulfonyl)-imidazole | 200 | 249 |
| XI | Phosphoric acid 85% | 25 | 182 |
| XII | Phosphoric acid 85% | 50 | 247 |
| XIII | Phosphoric acid 85% | 100 | 280 |
| XIV | Polyphosphoric acid | 25 | 284 |
| XV | Dibutyl phosphate | 50 | 120 |
| XVI | Dibutyl phosphate | 100 | 250 |
| XVII | Diphenyl phosphate | 50 | 221 |
| XVIII | Diphenyl phosphate | 100 | 280 |
| XIX | Phosphorous acid | 50 | 234 |
| XX | Dibutyl phosphite | 50 | 102 |
| XXI | Dibutyl phosphite | 100 | >250 |
| XXII | Diphenyl phosphite | 50 | 164 |
| XXIII | Diphenyl phosphite | 100 | 284 |
| XXIV | Triphenyl phosphite | 200 | 165 |
| XXV | Phenylphosphinic acid | 100 | >250 |
| XXVI | Phenylphosphonic acid | 100 | >250 |
| XXVII | Dichlorophenylphosphine | 200 | 281 |
| XXVIII | Boric acid | 200 | 161 |
| XXIX | Aluminium chloride | 25 | 182 |
| XXX | Aluminium chloride | 50 | 246 |
| XXXI | Aluminium chloride | 100 | 261 |
| XXXII | Zinc chloride | 100 | >250 |
| XXXIII | $CH_3CH_2NH_2 \cdot BCl_3$ | 50 | 170 |
| XXXIV | $CH_3CH_2NH_2 \cdot BCl_3$ | 100 | 232 |
| XXXV | $n\text{-}C_8H_{17}N(CH_3)_2 \cdot BCl_3$ | 50 | 160 |
| XXXVI | $n\text{-}C_8H_{17}N(CH_3)_2 \cdot BCl_3$ | 100 | 177.5 |
| XXXVII | $n\text{-}C_8H_{17}N(CH_3)_2 \cdot BCl_3$ | 200 | 242.5 |
| XXXVIII | [structure: phenyl-N with B(F,F)—O—C(CH₃)=CH—C(=O) ring] | 100 | 140.5 |
| XXXIX | [structure: phenyl-N with B(F,F)—O—C(CH₃)=CH—C(=O) ring] | 200 | 250 |
| XL | [structure: phenyl-N(CH₃)₂·BCl₃] | 200 | 236 |

TABLE 1-continued
Illustrative embodiments using various catalysts

| Example No. | Catalyst | mg/10 g polymer | Tg (°C.) |
| --- | --- | --- | --- |
| XLI | $(C_8H_{17})_3P.BCl_3$ | 200 | 144 |

EXAMPLES XLII-XLIV

The mixtures of imides indicated in Table 2, prepared in accordance with Example 1, 2, 3 or 4, are melted, mixed in each case with the amount of chlorosulfonic acid indicated, as catalyst, (the chlorosulfonic acid was in each case dissolved in the imide according to Example 2) and heated for 4 hours at 190° C. in a small aluminium dish exposed to the air. The glass transition temperature is determined after the crosslinked polymers have cooled.

TABLE 2

| Example No. | Imide according to Example | Amount of imide (g) | Amount of $CLSO_3H$ (g) | Tg (°C.) |
| --- | --- | --- | --- | --- |
| XLII | 1 | 19.0 | | |
| | 2 | 1.0 | 0.1 | 208 |
| XLIII | 3 | 18.0 | | |
| | 2 | 2.0 | 0.2 | 195 |
| XLIV | 4 | 18.0 | | |
| | 2 | 2.0 | 0.2 | 178 |

EXAMPLE XLV 1 g of diphenyl phosphite is dissolved in 100 g of a melt of the imide prepared in accordance with Example 1, and the melt is poured into a preheated steel mould of capacity $120 \times 120 \times 4$ mm$^3$ and is cured for 1 hour at 190° and for 2 hours at 250° C. A fault-free test sheet having the following properties is obtained:

Flexural strength (DIN 53,452): 38.5 N/mm$^2$
Impact strength (DIN 53,455): 3 kJ/m$^2$
Heat distortion point (ISO 75): 265° C.

EXAMPLES XLVI AND XLVII

Each of the imides indicated in Table 3 is melted and cured for 4 hours at 190° and for 2 hours at 250° C. using the amount of catalyst, 2-hydroxycyclohexyl p-toluenesulfonate (melting point 93°-95° C., prepared from cyclohexene oxide and p-toluenesulfonic acid monohydrate), indicated. The following properties are determined on the test specimens obtained in this way.

TABLE 3

| Example | XLVI | XLVII |
| --- | --- | --- |
| Imide according to Example | 1 | 5 |
| Amount of catalyst (% by weight) | 0.5 | 1.0 |
| Flexural strength, DIN 53,452, (N/mm$^2$) | 64.6 | 121.2 |
| Elongation, DIN 53,455, (%) | 2.2 | 5.0 |
| Impact strength, DIN 53,455, (kJ/m$^2$) | 6.85 | 13.8 |
| Glass transition temperature, Mettler TA 2000, (°C.) | 282.5 | 215 |
| Water absorption, 1 hour at 100° C. (% by weight) | 0.45 | 0.51 |
| Water absorption, 4 days at 25° C. (% by weight) | 1.10 | 0.79 |

What is claimed is:

1. A crosslinked polymer which can be obtained by heating an imide of the formula I

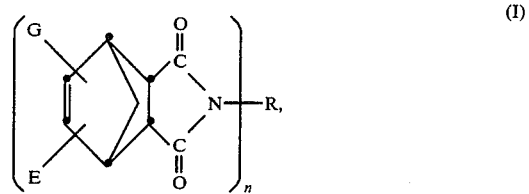

in which E is allyl or methallyl, G is hydrogen or methyl and n is 1 or 2, and, if n is 1, R is hydrogen, alkyl having 1-12 C atoms, alkenyl having 3-6 C atoms, cycloalkyl having 5-8 C atoms, aryl having 6-10 C atoms or benzyl, or, if n is 2, R is —$C_mH_{2m}$— in which m=2-20, arylene having 6-10 C atoms or a group of the formula II

in which T is methylene, isopropylidene, CO, O, S or SO$_2$, in the presence of at least one catalyst suitable for cationic polymerization.

2. A polymer according to claim 1, wherein the catalyst is employed in an amount between 0.1 and 5.0% by weight, based on the compound of the formula I.

3. A polymer according to claim 2, wherein the catalyst is employed in an amount between 0.25 and 4.0% by weight, based on the compound of the formula I.

4. A polymer according to claim 1, wherein the catalyst is an acid or a derivative of an acid which liberates acid.

5. A polymer according to claim 1, wherein the catalyst is a Brönsted oxo acid or an ester, anhydride or halide thereof or an amide or ammonium salt with organic bases containing nitrogen.

6. A polymer according to claim 5, wherein the oxo acid is an inorganic acid or an organic phosphorus-oxygen acid, an organic sulfur-oxygen acid or a carboxylic acid containing halogen.

7. A polymer according to claim 5, wherein the oxo acid is a hypophosphorous acid, a phosphonic acid or a phosphinic acid.

8. A polymer according to claim 5, wherein the oxo acid is an aliphatic sulfonic acid or an aromatic sulfonic acid.

9. A polymer according to claim 5, wherein the oxo acid is methanesulfonic acid, benzenesulfonic acid, naphthalene-2-sulfonic acid or p-toluenesulfonic acid.

10. A polymer according to claim 1, wherein the catalyst is a Lewis acid or a complex of a Lewis acid with a base.

11. A polymer according to claim 10, wherein the base is an amine, amide or phosphine.

12. A polymer according to claim 10, wherein the Lewis acid is a halide of an element from the group II, III, IV or V of the periodic system of the elements.

13. A polymer according to claim 10, wherein the Lewis acid is iron trichloride, tin tetrachloride, antimony pentafluoride, aluminium chloride, zinc chloride, boron trichloride or boron trifluoride.

14. A polymer according to claim 1, wherein the catalyst is p-toluenesulfonic acid, amyl benzenesulfonate, 2-hydroxycyclohexyl p-toluenesulfonate, diphenyl phosphite or the boron trichloride/ethylamine complex.

15. A polymer according to claim 1, wherein the catalyst is diphenyl phosphite.

16. A thermosetting mixture of substances which is stable on storage and which contains (a) a compound of the formula I

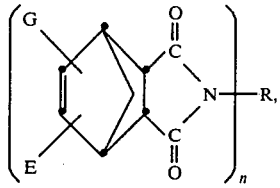

in which E is allyl or methallyl, G is hydrogen or methyl and n is 1 or 2, and, if n is 1, R is hydrogen, alkyl having 1–12 C atoms, alkenyl having 3–6 C atoms, cycloalkyl having 5–8 C atoms, aryl having 6–10 C atoms or benzyl, or, if n is 2, R is —$C_mH_{2m}$— in which m is 2–20, arylene having 6–10 C atoms or a group of the formula II

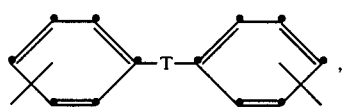

in which T is methylene, isopropylidene, CO, O, S or $SO_2$, and (b) one or more catalysts suitable for cationic polymerization.

17. A polymer according to claim 7 wherein the oxo acid catalyst is phenylphosphonic acid or phenylphosphinic acid.

18. A polymer according to claim 9 wherein the oxo acid catalyst is p-toluenesulfonic acid.

* * * * *

UNITED STATES PATENT AND TRADEMARK OFFICE
CERTIFICATE OF CORRECTION

PATENT NO. : 4,587,317
DATED : May 6, 1986
INVENTOR(S) : Alfred Renner

It is certified that error appears in the above-identified patent and that said Letters Patent is hereby corrected as shown below:

Column 12, Claim 5, Line 2, should read --
is a Brønstead oxo acid --.

Signed and Sealed this

Twenty-ninth Day of July 1986

[SEAL]

Attest:

*Attesting Officer*

DONALD J. QUIGG

*Commissioner of Patents and Trademarks*